US011927896B2

(12) United States Patent
Sato

(10) Patent No.: US 11,927,896 B2
(45) Date of Patent: Mar. 12, 2024

(54) DEVELOPER CARTRIDGE AND IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/050,649

(22) Filed: Oct. 28, 2022

(65) Prior Publication Data

US 2023/0138422 A1 May 4, 2023

(30) Foreign Application Priority Data

Nov. 2, 2021 (JP) ................................ 2021-179840

(51) Int. Cl.
*G03G 15/08* (2006.01)

(52) U.S. Cl.
CPC ..... *G03G 15/0889* (2013.01); *G03G 15/0872* (2013.01)

(58) Field of Classification Search
CPC ........... G03G 15/0867; G03G 15/0868; G03G 15/087; G03G 15/0872; G03G 15/0889; G03G 21/1647; G03G 21/1676
See application file for complete search history.

(56) References Cited

U.S. PATENT DOCUMENTS

2017/0261921 A1 9/2017 Kawamura et al.
2021/0080861 A1* 3/2021 Shimizu ............. G03G 21/1676

FOREIGN PATENT DOCUMENTS

JP 2017-167522 A 9/2017

* cited by examiner

*Primary Examiner* — Hoang X Ngo
(74) *Attorney, Agent, or Firm* — Merchant & Gould P.C.

(57) ABSTRACT

A developer cartridge includes a developing roller, a developer housing supporting the developing roller, and a toner storage unit including a first storage chamber capable of storing toner, and a second storage chamber storing the developer housing. The toner storage unit supports the developer housing such that the developer housing is movable with respect to the first storage chamber.

19 Claims, 13 Drawing Sheets

6Y

DEVELOPER CARTRIDGE AND IMAGE FORMING APPARATUS

REFERENCE TO RELATED APPLICATIONS

The present application claims priority from Japanese Patent Application No. 2021-179840, which was filed on Nov. 2, 2021, the disclosure of which is herein incorporated by reference in its entirety.

BACKGROUND ART

The following disclosure relates to a developer cartridge and an image forming apparatus.

There has been known a conventional image forming apparatus including an apparatus body having an opening, a cartridge and an intermediate transfer unit located above the cartridge. The cartridge includes, as one body, a photoconductive drum and a developing unit. The developing unit includes a developing roller. The cartridge is mountable on and removable from the apparatus body in an axis direction of the photoconductive drum through the opening.

DESCRIPTION

In the image forming apparatus, there is a case in which the cartridge is configured such that the cartridge is dividable into a drum cartridge including the photoconductive drum and a developer cartridge including the developing roller.

In the conventional image forming apparatus, however, the opening through which the cartridge passes is located on a first side with respect to the cartridge in the axis direction of the photoconductive drum. Accordingly, it is hard to provide a member supporting a first end of the drum cartridge in the axis direction of the photoconductive drum and supporting a first end of the developer cartridge in the axis direction of the photoconductive drum.

Accordingly, it is hard to secure degree of parallelization of the developing roller with respect to the photoconductive drum while the developing roller is configured to be movable with respect to the photoconductive drum.

An aspect of the disclosure relates to a developer cartridge and an image forming apparatus capable of securing degree of parallelization of a developing roller with respect to a photoconductive drum while the developing roller is movable with respect to the photoconductive drum.

In one aspect of the disclosure, a developer cartridge includes a developing roller, a developer housing supporting the developing roller, and a toner storage unit including a first storage chamber capable of storing toner, and a second storage chamber storing the developer housing. The toner storage unit supports the developer housing such that the developer housing is movable with respect to the first storage chamber.

In another aspect of the disclosure, an image forming apparatus includes a body housing, a transfer unit, a drum cartridge including a photoconductive drum and located below the transfer unit in a state in which the drum cartridge is mounted on the body housing, a developer cartridge including a developing roller, a developer housing supporting the developing roller, and a toner storage unit including a first storage chamber capable of storing toner and a second storage chamber storing the developer housing, the toner storage unit supporting the developer housing such that the developer housing is movable with respect to the first storage chamber, a support frame supporting the toner storage unit in a state in which the developer cartridge is mounted on the body housing.

The objects, features, advantages, and technical and industrial significance of the present disclosure will be better understood by reading the following detailed description of the embodiments, when considered in connection with the accompanying drawings, in which.

OVERVIEW OF IMAGE FORMING APPARATUS

There will be described an overview of an image forming apparatus 1 in detail with reference to FIG. 1 to FIG. 3.

It is noted that an up and down direction in the following description is an up and down direction defined when the image forming apparatus 1 is placed on a horizontal plane. Moreover, a first direction in the description of the image forming apparatus 1 is a first direction defined when a developer cartridge 6Y is mounted on the image forming apparatus 1.

Figure 1:
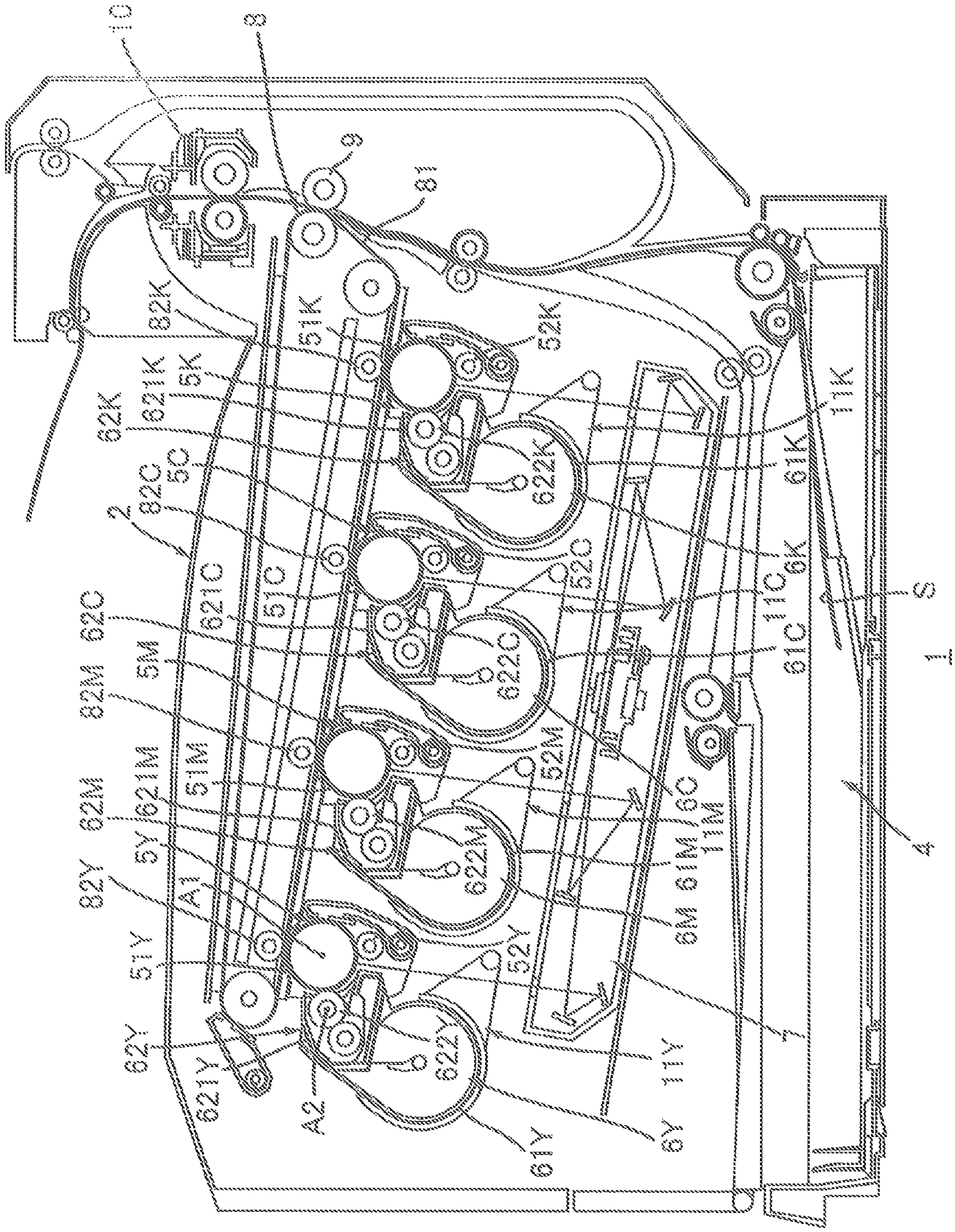
FIG. 1 is a schematic view of a configuration of an image forming apparatus.

As illustrated in FIG. 1, the image forming apparatus 1 includes a body housing 2, a cover 3 (see FIG. 2), a sheet tray 4, a plurality of drum cartridges 5Y, 5M, 5C, 5K, a plurality of developer cartridges 6Y, 6M, 6C, 6K, an exposing unit 7, a transfer unit 8, a transfer roller 9 and a fixing unit 10.

Body Housing

The body housing 2 accommodates the sheet tray 4, the plurality of drum cartridges 5Y, 5M, 5C, 5K, the plurality of developer cartridges 6Y, 6M, 6C, 6K, the exposing unit 7, the transfer unit 8, the transfer roller 9 and the fixing unit 10. The body housing 2 has an opening 21 (see FIG. 3). The opening 21 is located at a first end of the body housing 2 in the first direction.

Cover

Figure 2:
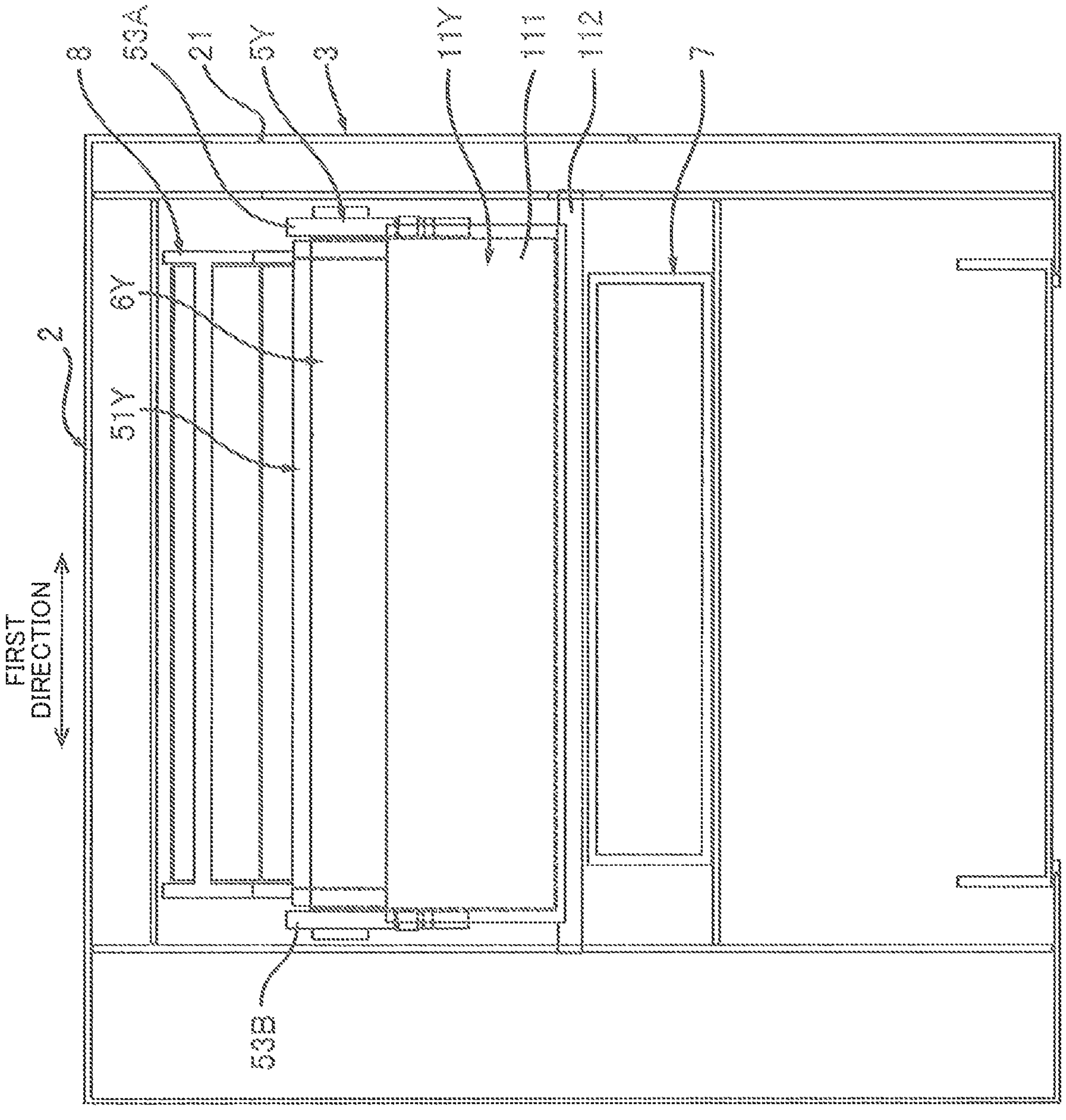
FIG. 2 is a view for explaining mounting and removing of a drum cartridge and a developer cartridge illustrated in FIG. 1 in a state in which a cover is positioned at a closed position.
Figure 3:
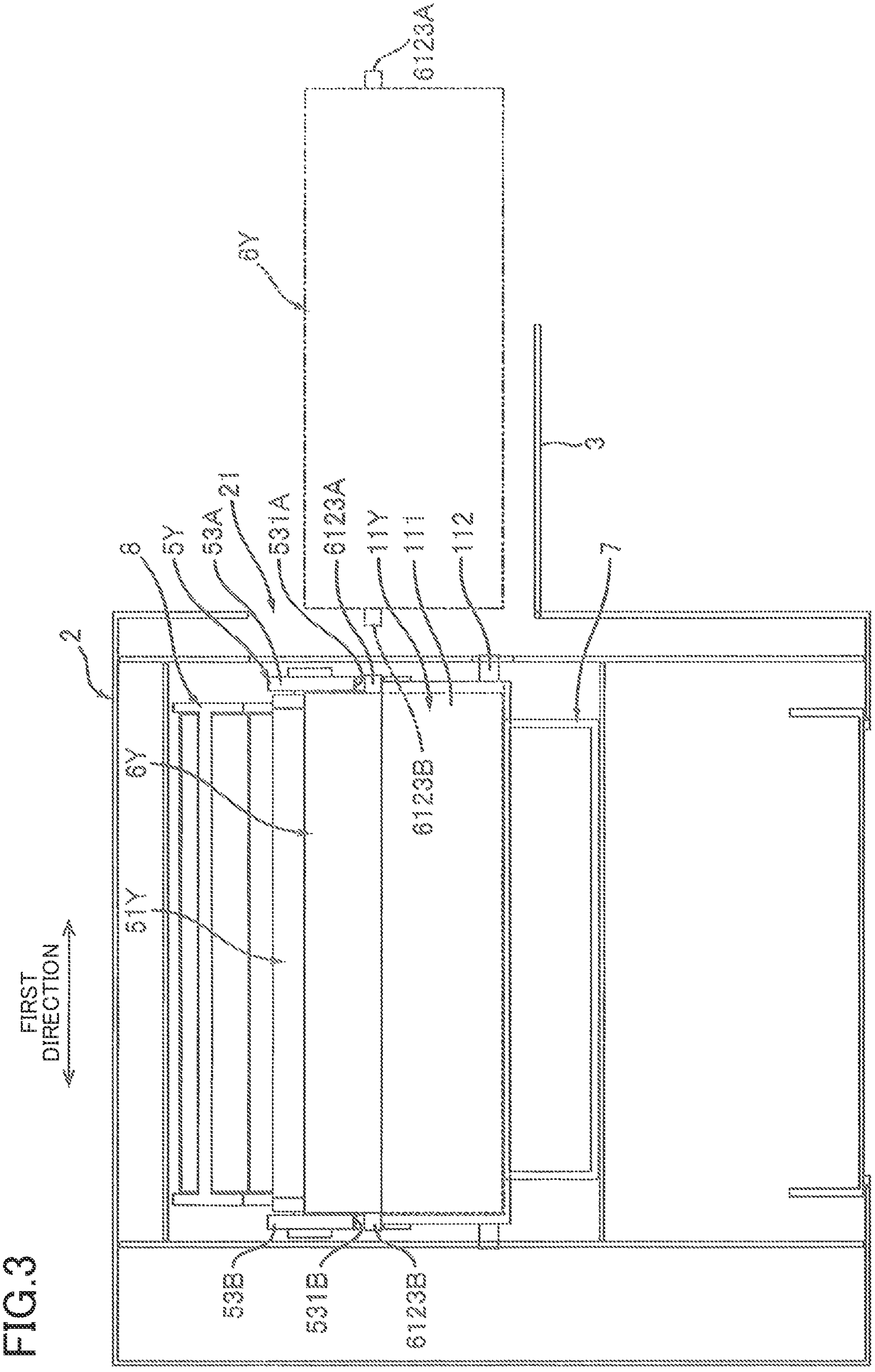
FIG. 3 is a state in which the cover illustrated in FIG. 2 is positioned at an open position.

As illustrated in FIG. 2 and FIG. 3, the cover 3 is movable between a closed position (see FIG. 2) and an open position (see FIG. 3). In a state in which the cover 3 is positioned at the closed position, the cover 3 closes the opening 21. In a state in which the cover 3 is positioned at the open position, the opening 21 is open.

Sheet Tray

As illustrated in FIG. 1, the sheet tray 4 is capable of accommodating a sheet S. The sheet S in the sheet tray 4 is conveyed toward the transfer roller 9.

Drum Cartridges

As illustrated in FIG. 3, in the state in which the cover 3 is positioned at the open position, each of the plurality of drum cartridges 5Y, 5M, 5C, 5K is mountable on and removable from the body housing 2 through the opening 21. Each of the plurality of drum cartridges 5Y, 5M, 5C, 5K is mountable on and removable from the body housing 2 in the first direction. As illustrated in FIG. 1, in a state in which the plurality of drum cartridges 5Y, 5M, 5C, 5K are mounted on the body housing 2, the plurality of drum cartridges 5Y, 5M, 5C, 5K are located below the transfer unit 8. The drum cartridge 5Y includes a photoconductive drum 51Y and a charging unit 52Y.

The photoconductive drum 51Y extends in the first direction. The photoconductive drum 51Y has a cylindrical shape. The photoconductive drum 51Y is rotatable around a drum axis A1. The drum axis A1 extends in the first direction.

The charging unit 52Y charges the photoconductive drum 51Y. In the present embodiment, the charging unit 52Y is a charging roller. The charging unit 52Y may be a scorotron type charging unit.

It is noted that each of the drum cartridges 5M, 5C, 5K has the same configuration as the drum cartridge 5Y. Accordingly, an explanation of the drum cartridges 5M, 5C, 5K is dispensed with.

Developer Cartridges

As illustrated in FIG. 3, in the state in which the cover 3 is positioned at the open position, the plurality of developer cartridges 6Y, 6M, 6C, 6K are mountable on and removable from the body housing 2 through the opening 21. As illustrated in FIG. 1, in a state in which the plurality of developer cartridges 6Y, 6M, 6C, 6K are mounted on the body housing 2, the plurality of developer cartridges 6Y, 6M, 6C, 6K are located below the transfer unit 8. The developer cartridge 6Y includes a toner storage unit 61Y and a developing unit 62Y.

The toner storage unit 61Y is capable of storing toner.

The developing unit 62Y is supported by the toner storage unit 61Y. The developing unit 62Y includes a developer housing 621Y and a developing roller 622Y. In other words, the developer cartridge 6Y includes the developer housing 621Y and the developing roller 622Y.

The developer housing 621Y supports the developing roller 622Y. The developer housing 621Y is capable of receiving toner from the toner storage unit 61Y. The developer housing 621Y is capable of storing the toner from the toner storage unit 61Y.

The developing roller 622Y is capable of supplying the toner in the developer housing 621Y to the photoconductive drum 51Y. The developing roller 622Y is in contact with the photoconductive drum 51Y. The developing roller 622Y may be capable of being spaced apart from the photoconductive drum 51Y. The developing roller 622Y extends in the first direction. The developing roller 622Y is rotatable around a developer axis A2. The developer axis A2 extends in the first direction.

It is noted that each of the developer cartridges 6M, 6C, 6K has the same configuration as the developer cartridge 6Y. Accordingly, an explanation of the developer cartridges 6M, 6C, 6K is dispensed with.

Exposing Unit

In a state in which the plurality of drum cartridges 5Y, 5M, 5C, 5K are mounted on the image forming apparatus 1, the exposing unit 7 is capable of exposing a circumferential surface of each of the photoconductive drums 51Y, 51M, 51C, 51K. In the present embodiment, the exposing unit 7 is a laser scanning unit.

Transfer Unit

In the state in which the plurality of drum cartridges 5Y, 5M, 5C, 5K are mounted on the image forming apparatus 1, the transfer unit 8 is located above the plurality of drum cartridges 5Y, 5M, 5C, 5K. The transfer unit 8 includes an intermediate belt 81 and transfer rollers 82Y, 82M, 82C, 82K.

In the state in which the plurality of drum cartridges 5Y, 5M, 5C, 5K are mounted on the image forming apparatus 1, the intermediate belt 81 is in contact with each of the photoconductive drums 51Y, 51M, 51C, 51K.

The transfer roller 82Y transfers toner on the photoconductive drum 51Y to the intermediate belt 81. The transfer roller 82M transfers toner on the photoconductive drum 51M to the intermediate belt 81. The transfer roller 82C transfers toner on the photoconductive drum 51C to the intermediate belt 81. The transfer roller 82K transfers toner on the photoconductive drum 51K to the intermediate belt 81.

Transfer Roller

The transfer roller 9 transfers the toner on the intermediate belt 81 to the sheet S. More specifically, the sheet S conveyed from the sheet tray 4 toward the transfer roller 9 is conveyed to the fixing unit 10 between the transfer roller 9 and the intermediate belt 81. At this time, the transfer roller 9 transfers the toner on the intermediate belt 81 to the sheet S.

Fixing Unit

The fixing unit 10 heats and presses the sheet S to which the toner is transferred, and causes the toner to be fixed onto the sheet S. The sheet S having passed through the fixing unit 10 is discharged to an upper surface of the body housing 2.

Details of Developer Cartridge

Figure 4:
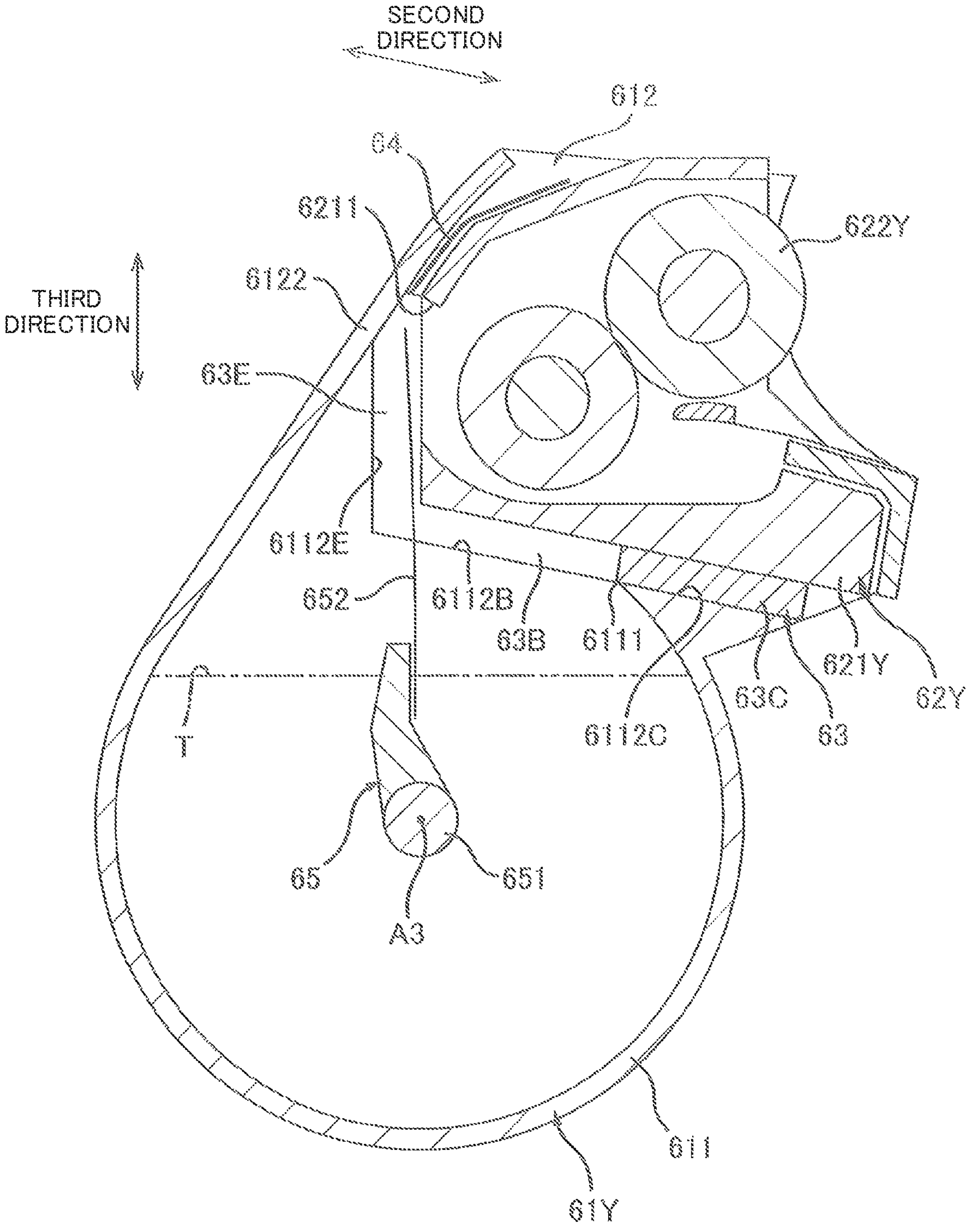
FIG. 4 is a cross-sectional view of a central part of the developer cartridge illustrated in FIG. 1.
Figure 5:
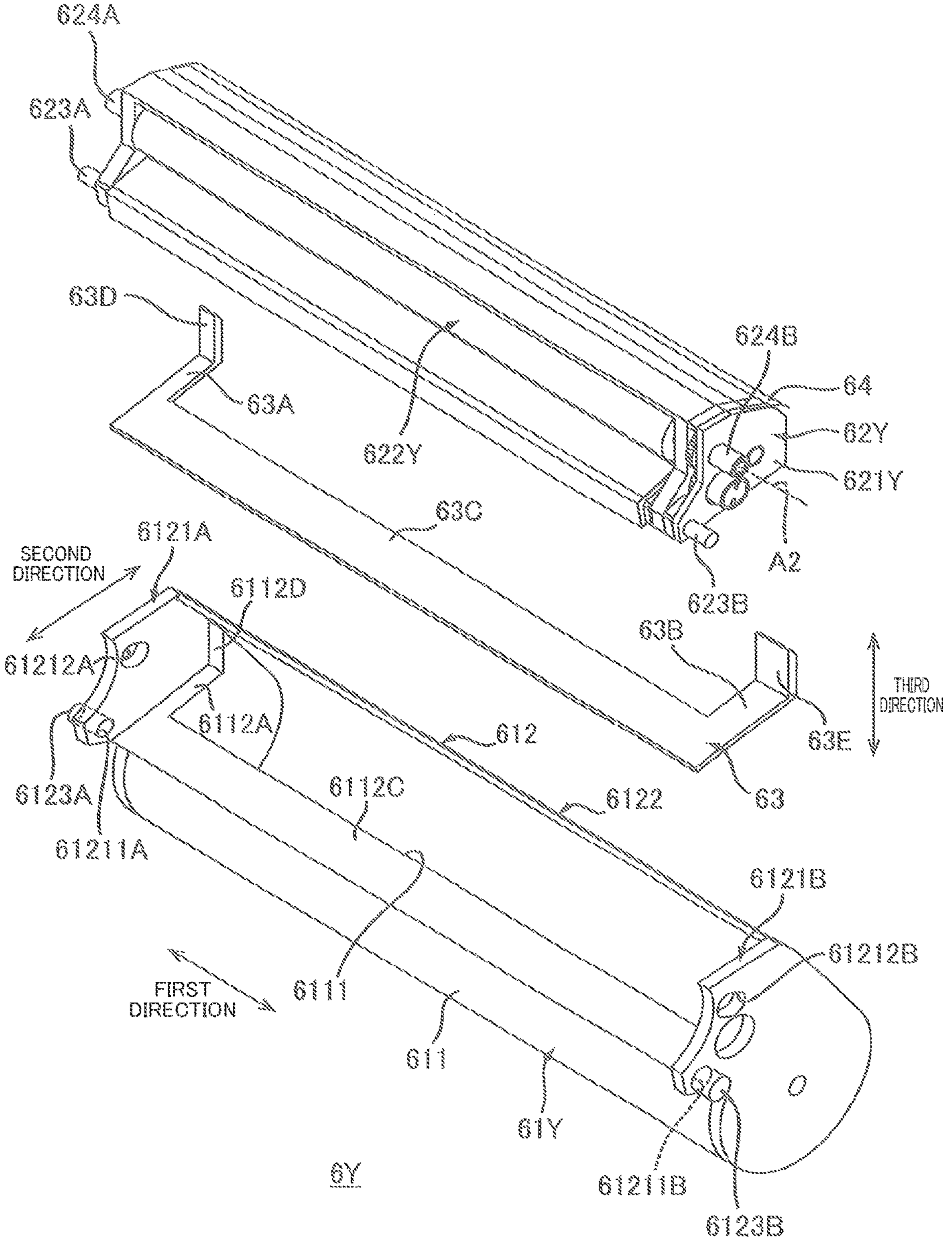
FIG. 5 is a disassembled perspective view of the developer cartridge illustrated in FIG. 1.

Next, there will be described the developer cartridge 6Y in detail with reference to FIG. 4 to FIG. 7. As illustrated in FIG. 4 and FIG. 5, the developer cartridge 6Y includes a first seal member 63, a second seal member 64, an agitator 65 (see FIG. 4) in addition to the toner storage unit 61Y and the developing unit 62Y.

Details of Toner Storage Unit

As illustrated in FIG. 5, the toner storage unit 61Y extends in the first direction. The toner storage unit 61Y includes a first storage chamber 611 and a second storage chamber 612.

First Storage Chamber

The first storage chamber 611 is capable of storing toner. The first storage chamber 611 extends in the first direction. The first storage chamber 611 has a cylindrical shape. As illustrated in FIG. 4, in a state in which the developer cartridge 6Y is mounted on the image forming apparatus 1, an upper surface T of the toner in the first storage chamber 611 indicating an amount of the toner in the first storage chamber 611 is located at a position lower than the developer housing 621Y. In other words, in the state in which the developer cartridge 6Y is mounted on the image forming apparatus 1, the upper surface T of the toner in the toner storage unit 61Y indicating the amount of the toner in the toner storage unit 61Y is located at the position lower than the developer housing 621Y.

As illustrated in FIG. 5, the first storage chamber 611 includes an opening 6111, a first support surface 6112A, a second support surface 6112B (see FIG. 4), a third support surface 6112C, a fourth support surface 6112D and a fifth support surface 6112E (see FIG. 4). In other words, the toner storage unit 61Y includes the opening 6111, the first support surface 6112A, the second support surface 6112B and the third support surface 6112C.

The opening 6111 allows the first storage chamber 611 and the second storage chamber 612 to be communicated with each other. The opening 6111 is located at a boundary position between the first storage chamber 611 and the second storage chamber 612. In the state in which the developer cartridge 6Y is mounted on the image forming apparatus 1, the opening 6111 is located at an upper end of the first storage chamber 611. The opening 6111 extends in the first direction. The opening 6111 communicates with an inlet opening 6211 of the developer housing 621Y (see FIG. 4). The inlet opening 6211 will be described below. The toner is permitted to pass through the opening 6111 from the toner storage unit 61Y to the developer housing 621Y.

The first support surface 6112A is located on a first side with respect to the opening 6111 in the first direction. The first support surface 6112A supports a first end of the developer housing 621Y in the first direction. The first support surface 6112A has a width in the first direction and extends in a second direction. The second direction intersects the first direction. It is preferable that the second direction is orthogonal to the first direction.

The second support surface 6112B illustrated in FIG. 4 is located on a second side with respect to the opening 6111 in the first direction (see FIG. 5). In other words, the second support surface 6112B is located on an opposite side of the first support surface 6112A with respect to the opening 6111 in the first direction. The second support surface 6112B supports a second end of the developer housing 621Y in the first direction. As similar to the first support surface 6112A, the second support surface 6112B has a width in the first direction and extends in the second direction.

The third support surface 6112C is located on a first side with respect to the opening 6111 in the second direction. The third support surface 6112C supports a first end of the developer housing 621Y in the second direction. The third support surface 6112C has a width in the second direction and extends in the first direction. A first end of the third support surface 6112C in the first direction continues to the first support surface 6112A. A second end of the third support surface 6112C in the first direction continues to the second support surface 6112B.

The fourth support surface 6112D is located on the first side with respect to the opening 6111 in the first direction. The fourth support surface 6112D supports the first end of the developer housing 621Y in the first direction together with the first support surface 6112A. The fourth support surface 6112D has a width in the first direction and extends in a third direction. The third direction intersects the first direction and the second direction. It is preferable that the third direction is orthogonal to the first direction and intersects the second direction. In the state in which the developer cartridge 6Y is mounted on the image forming apparatus 1, the third direction is an up and down direction. A first end of the fourth support surface 6112D in the third direction continues to the first support surface 6112A. A second end of the fourth support surface 6112D in the third direction continues to an inner surface of a cover side wall 6122.

The fifth support surface 6112E illustrated in FIG. 4 is located on the second side with respect to the opening 6111 in the first direction. The fifth support surface 6112E supports the second end of the developer housing 621Y in the first direction together with the second support surface 6112B. As similar to the fourth support surface 6112D (see FIG. 5), the fifth support surface 6112E has a width in the first direction and extends in the third direction. A first end of the fifth support surface 6112E in the third direction continues to the second support surface 6112B. A second end of the fifth support surface 6112E in the third direction continues to the inner surface of the cover side wall 6122.

Second Storage Chamber

The second storage chamber 612 stores the developer housing 621Y. The second storage chamber 612 is located on a second side with respect to the first storage chamber 611 in the third direction. In the state in which the developer cartridge 6Y is mounted on the image forming apparatus 1, the second storage chamber 612 is located above the first storage chamber 611.

As illustrated in FIG. 5, the second storage chamber 612 includes two support side walls 6121A, 6121B, the cover side wall 6122 and two receiving portions 6123A, 6123B. In other words, the toner storage unit 61Y includes the cover side wall 6122 and the two receiving portions 6123A, 6123B.

The support side wall 6121A is located on a first end of the toner storage unit 61Y in the first direction. The support side wall 6121A is located on a first side with respect to the first support surface 6112A in the first direction. In other words, the support side wall 6121A is located on an outer side with respect to the first support surface 6112A in the first direction. The support side wall 6121A is located on an opposite side of the opening 6111 in the first direction with respect to the first support surface 6112A. The support side wall 6121A extends in the second direction and the third direction. The support side wall 6121A supports the first end of the developer housing 621Y in the first direction. The support side wall 6121A has a hole 61211A and a hole 61212A. In other words, the second storage chamber 612 of the toner storage unit 61Y has the hole 61212A.

The hole 61211A is located at a first end of the support side wall 6121A in the second direction. The hole 61212A is located on an opposite side of the cover side wall 6122 in the second direction with respect to the opening 6111. The hole 61211A has a circular shape. A shaft 623A of the developing unit 62Y is fitted into the hole 61211A. The shaft 623A will be described below.

The hole 61212A is spaced apart from the hole 61211A. In the present embodiment, the hole 61212A is located between the hole 61211A and the cover side wall 6122 in the second direction. The hole 61212A extends in a direction intersecting the first direction. More specifically, the hole 61212A extends in a circumferential direction of a circle centered around the hole 61211A. A protrusion 624A of the developing unit 62Y is fitted into the hole 61212A. The protrusion 624A will be described below.

The support side wall 6121B is located at a second end of the toner storage unit 61Y in the first direction. The support side wall 6121B is located on a second side with respect to the second support surface 6112B (see FIG. 4) in the first direction. In other words, the support side wall 6121B is located on an outer side with respect to the second support surface 6112B in the first direction. The support side wall 6121B is located on an opposite side of the opening 6111 in the first direction with respect to the second support surface 6112B. The support side wall 6121B extends in the second direction and the third direction. The support side wall 6121B supports the second end of the developer housing 621Y in the first direction. The support side wall 6121B has a hole 61211B and a hole 61212B.

The hole 61211B is located at a first end of the support side wall 6121B in the second direction. The hole 61212B is located on an opposite side of the cover side wall 6122 in the second direction with respect to the opening 6111. The hole 61211B has a circular shape. A shaft 623B of the developing unit 62Y is fitted into the hole 61211B. The shaft 623B will be described below.

The hole 61212B is spaced apart from the hole 61211B. In the present embodiment, the hole 61212B is located between the hole 61211B and the cover side wall 6122 in the second direction. The hole 61212B extends in a direction in which the hole 61212A extends. That is, the hole 61212B extends in a circumferential direction of a circle centered around the hole 61211B. A protrusion 624B of the developing unit 62Y is fitted into the hole 61212B. The protrusion 624B will be described below.

The cover side wall 6122 is located on the second side with respect to the opening 6111 in the second direction. The cover side wall 6122 covers the second end of the developer housing 621Y in the second direction. The cover side wall 6122 extends in the first direction. The cover side wall 6122 is inclined with respect to the third direction. As illustrated in FIG. 4, the cover side wall 6122 is inclined so as to be apart from the developer housing 621Y in the second direction as approaching the first storage chamber 611 in the third direction. As illustrated in FIG. 5, a first end of the cover side wall 6122 in the first direction is connected to the support side wall 6121A. A second end of the cover side wall 6122 in the first direction is connected to the support side wall 6121B.

The receiving portion 6123A is located on an outer side with respect to the support side wall 6121A in the first direction. In other words, the receiving portion 6123A is located on an opposite side of the opening 6111 in the first direction with respect to the support side wall 6121A. In the present embodiment, the receiving portion 6123A protrudes outwardly, in the first direction, from an outer surface of the support side wall 6121A in the first direction. In other words, the receiving portion 6123A protrudes outwardly, in the first direction, from an outer surface of the second storage chamber 612 in the first direction. It is noted that the receiving portion 6123A may be attached to the outer surface of the support side wall 6121A. The receiving portion 6123A has a tubular shape. In the present embodiment, the receiving portion 6123A has a cylindrical shape. An inner space of the receiving portion 6123A communicates with the hole 61211A. The shaft 623A is fitted into the receiving portion 6123A. The receiving portion 6123A receives the shaft 623A.

The receiving portion 6123B is located on an outer side with respect to the support side wall 6121B in the first direction. In other words, the receiving portion 6123B is located on an opposite side of the opening 6111 in the first direction with respect to the support side wall 6121B. In the present embodiment, the receiving portion 6123B protrudes outwardly, in the first direction, from an outer surface of the support side wall 6121B in the first direction. In other words, the receiving portion 6123B protrudes outwardly, in the first direction, from the outer surface of the second storage chamber 612 in the first direction. It is noted that the receiving portion 6123B may be attached to the outer surface of the support side wall 6121B. The receiving portion 6123B has a tubular shape. In the present embodiment, the receiving portion 6123B has a cylindrical shape. An inner space of the receiving portion 6123B communicates with the hole 61211B. The shaft 623B is fitted into the receiving portion 6123B. The receiving portion 6123B receives the shaft 623B.

Details of Developing Unit

The developing unit 62Y includes the two shafts 623A, 623B and the two protrusions 624A, 624B in addition to the developer housing 621Y and the developing roller 622Y. In other words, the developer cartridge 6Y includes the two shafts 623A, 623B. In the present embodiment, the shaft 623A functions as a first engaging portion, and the shaft 623B functions as a second engaging portion.

Details of Developer Housing

The developer housing 621Y extends in the first direction. The developer housing 621Y has a tubular shape. As illustrated in FIG. 4, the second end of the developer housing 621Y in the second direction is opposed to the cover side wall 6122. The developer housing 621Y has the inlet opening 6211.

The inlet opening 6211 is capable of receiving toner from the toner storage unit 61Y. The toner from the toner storage unit 61Y enters into the developer housing 621Y passing between the cover side wall 6122 and the developer housing 621Y, and through the inlet opening 6211. The inlet opening 6211 is located at the second end of the developer housing 621Y in the second direction.

Shaft

As illustrated in FIG. 5, the shaft 623A is located at the first end of the developer housing 621Y in the first direction. The shaft 623A protrudes outwardly, in the first direction, from a first side surface of the developer housing 621Y in the first direction. It is noted that the shaft 623A may be attached to the first side surface of the developer housing 621Y in the first direction. The shaft 623A is spaced apart from the developer axis A2. The shaft 623A has a column shape. The shaft 623A is fitted into the receiving portion 6123A of the toner storage unit 61Y through the hole 61211A of the toner storage unit 61Y.

The shaft 623B is located at the second end of the developer housing 621Y in the first direction. The shaft 623B protrudes outwardly, in the first direction, from a second side surface of the developer housing 621Y in the first direction. It is noted that the shaft 623B may be attached to the second side surface of the developer housing 621Y in the first direction. The shaft 623B is spaced apart from the developer axis A2. The shaft 623B has a column shape. The shaft 623B is fitted into the receiving portion 6123B of the toner storage unit 61Y through the hole 61211B of the toner storage unit 61Y.

Protrusion

The protrusion 624A protrudes outwardly, in the first direction, from the first side surface of the developer housing 621Y in the first direction. It is noted that the protrusion 624A may be attached to the first side surface of the developer housing 621Y in the first direction. The protrusion 624A is spaced apart from the shaft 623A. The protrusion 624A has a cylindrical shape. In the present embodiment, the protrusion 624A receives a shaft of the developing roller 622Y. The protrusion 624A is fitted into the hole 61212A of the toner storage unit 61Y.

The protrusion 624B protrudes outwardly, in the first direction, from the second side surface of the developer housing 621Y in the first direction. It is noted that the protrusion 624B may be attached to the second side surface of the developer housing 621Y of the first direction. The protrusion 624B is spaced apart from the shaft 623B. The protrusion 624B has a cylindrical shape. In the present embodiment, the protrusion 624B receives the shaft of the developing roller 622Y. The protrusion 624B is fitted into the hole 61212B of the toner storage unit 61Y.

When the shaft 623A is fitted into the receiving portion 6123A, the shaft 623B is fitted into the receiving portion 6123B, the protrusion 624A is fitted into the hole 61212A and the protrusion 624B is fitted into the hole 61212B, the developer housing 621Y is supported by the toner storage unit 61Y so as to be movable. The developer housing 621Y is movable with respect to the toner storage unit 61Y in a direction in which each of the hole 61212A and the hole 61212B extends. In the present embodiment, the developer housing 621Y is rotatable around the shaft 623A and the shaft 623B with respect to the toner storage unit 61Y.

First Seal Member

As illustrated in FIG. 4, the first seal member 63 seals an area between the toner storage unit 61Y and the developer housing 621Y. The first seal member 63 is elastically deformable in accordance with a movement of the developer housing 621Y. The first seal member 63 is, for example, a sponge. As illustrated in FIG. 5, the first seal member 63 includes a first seal portion 63A, a second seal portion 63B, a third seal portion 63C, a fourth seal portion 63D and a fifth seal portion 63E.

The first seal portion 63A is located at a first end of the first seal member 63 in the first direction. The first seal portion 63A has a width in the first direction and extends in the second direction. The first seal portion 63A is located between the first end of the developer housing 621Y in the first direction and the first support surface 6112A of the toner storage unit 61Y. The first seal portion 63A is in contact with the first end of the developer housing 621Y in the first direction and the first support surface 6112A of the toner storage unit 61Y. The first seal portion 63A seals an area between the first end of the developer housing 621Y and the first support surface 6112A in the first direction.

The second seal portion 63B is located at a second end of the first seal member 63 in the first direction. The second seal portion 63B is spaced apart from the first seal portion 63A in the first direction. The second seal portion 63B has a width in the first direction and extends in the second direction. The second seal portion 63B is located between the second end of the developer housing 621Y in the first direction and the second support surface 6112B of the toner storage unit 61Y (see FIG. 4). The second seal portion 63B is in contact with the second end of the developer housing 621Y in the first direction and the second support surface 6112B of the toner storage unit 61Y. The second seal portion 63B seals an area between the second end of the developer housing 621Y in the first direction and the second support surface 6112B.

The third seal portion 63C is located between the first seal portion 63A and the second seal portion 63B in the first direction. The third seal portion 63C has a width in the second direction and extends in the first direction. A first end of the third seal portion 63C in the first direction continues to the first seal portion 63A. A second end of the third seal portion 63C in the first direction continues to the second seal portion 63B. The third seal portion 63C is located between the first end of the developer housing 621Y in the second direction and the third support surface 6112C of the toner storage unit 61Y. The third seal portion 63C is in contact with the first end of the developer housing 621Y in the second direction and the third support surface 6112C of the toner storage unit 61Y. The third seal portion 63C seals an area between the first end of the developer housing 621Y in the second direction and the third support surface 6112C.

The fourth seal portion 63D is located at the first end of the first seal member 63 in the first direction. The fourth seal portion 63D is located at a second end of the first seal portion 63A in the second direction. The fourth seal portion 63D has a width in the first direction. The fourth seal portion 63D extends, in the third direction, from the second end of the first seal portion 63A in the second direction. The fourth seal portion 63D is located between the first end of the developer housing 621Y the first direction and the fourth support surface 6112D of the toner storage unit 61Y. The fourth seal portion 63D is in contact with the first end of the developer housing 621Y in the first direction and the fourth support surface 6112D of the toner storage unit 61Y. The fourth seal portion 63D seals an area between the first end of the developer housing 621Y in the first direction and the fourth support surface 6112D.

The fifth seal portion 63E is located at the second end of the first seal member 63 in the first direction. The fifth seal portion 63E is located at a second end of the second seal portion 63B in the second direction. The fifth seal portion 63E has a width in the first direction. The fifth seal portion 63E extends, in the third direction, from the second end of the second seal portion 63B in the first direction. The fifth seal portion 63E is located between the second end of the developer housing 621Y in the first direction and the fifth support surface 6112E of the toner storage unit 61Y (see FIG. 4). The fifth seal portion 63E is in contact with the second end of the developer housing 621Y in the first direction and the fifth support surface 6112E of the toner storage unit 61Y. The fifth seal portion 63E seals an area between the second end of the developer housing 621Y in the first direction and the fifth support surface 6112E.

Second Seal Member

As illustrated in FIG. 4, the second seal member 64 is located between the second end of the developer housing 621Y in the second direction and the cover side wall 6122 of the toner storage unit 61Y. As illustrated in FIG. 5, the second seal member 64 extends in the first direction. The second seal member 64 extends in the first direction from the fourth seal portion 63D to the fifth seal portion 63E. The second seal member 64 is adhered to the second end of the developer housing 621Y in the second direction and in contact with the cover side wall 6122 of the toner storage unit 61Y. The second seal member 64 seals an area between the second end of the developer housing 621Y in the second direction and the cover side wall 6122. The second seal member 64 is, for example, a film. The second seal member 64 may be a sponge.

Agitator

As illustrated in FIG. 4, the agitator 65 is located in the first storage chamber 611 of the toner storage unit 61Y. The agitator 65 is capable of agitating the toner in the first storage chamber 611 of the toner storage unit 61Y. The agitator 65 is capable of conveying the toner in the toner storage unit 61Y toward the inlet opening 6211 of the developer housing 621Y. The agitator 65 is rotatable around an agitator axis A3. The agitator axis A3 extends in the first direction. In the state in which the developer cartridge 6Y is mounted on the image forming apparatus 1, the agitator axis A3 is located at a position lower than the developer housing 621Y. The agitator 65 includes a shaft 651 and a blade 652.

The shaft 651 extends in the first direction along the agitator axis A3.

The blade 652 extends from the shaft 651. The blade 652 is rotatable together with the shaft 651. The blade 652 is capable of conveying the toner in the toner storage unit 61Y toward the inlet opening 6211. An edge of the blade 652 is reachable to the inlet opening 6211.

Details of Drum Cartridge

There will be described the drum cartridge 5Y in detail with reference to FIG. 2, FIG. 3 and FIG. 6.

As illustrated in FIG. 2, the drum cartridge 5Y includes two side plates 53A, 53B in addition to the photoconductive drum 51Y and the charging unit 52Y.

The side plate 53A is located at a first end of the drum cartridge 5Y in the first direction. The side plate 53A supports a first end of the photoconductive drum 51Y in the first direction. As illustrated in FIG. 6, the side plate 53A includes a first engaged portion 531A. In other words, the drum cartridge 5Y includes the first engaged portion 531A.

The first engaged portion 531A is located at the first end of the drum cartridge 5Y in the first direction. The first engaged portion 531A is a groove. In a state in which the developer cartridge 6Y and the drum cartridge 5Y are mounted on the image forming apparatus 1, the receiving portion 6123A of the toner storage unit 61Y is fitted into the first engaged portion 531A. As a result of this, in the state in which the developer cartridge 6Y and the drum cartridge 5Y are mounted on the image forming apparatus 1, the shaft 623A of the developing unit 62Y (see FIG. 5) engages with the first engaged portion 531A via the receiving portion 6123A.

As illustrated in FIG. 2, the side plate 53B is spaced apart from the side plate 53A in the first direction. The side plate 53B is located at a second end of the drum cartridge 5Y in the first direction. The side plate 53B supports a second end of the photoconductive drum 51Y in the first direction. As illustrated in FIG. 3, the side plate 53B includes a second engaged portion 531B. In other words, the drum cartridge 5Y includes the second engaged portion 531B.

The second engaged portion 531B is located at the second end of the drum cartridge 5Y in the first direction. The second engaged portion 531B is a groove. In the state in which the developer cartridge 6Y and the drum cartridge 5Y are mounted on the image forming apparatus 1, the receiving portion 6123B of the toner storage unit 61Y is fitted into the second engaged portion 531B. As a result of this, in the state in which the developer cartridge 6Y and the drum cartridge 5Y are mounted on the image forming apparatus 1, the shaft 623B of the developing unit 62Y (see FIG. 5) engages with the second engaged portion 531B via the receiving portion 6123B.

Details of Image Forming Apparatus

There will be described next the image forming apparatus 1 in detail with reference to FIG. 6 and FIG. 7.

As illustrated in FIG. 1, the image forming apparatus 1 further includes a plurality of support frames 11Y, 11M, 11C, 11K.

The support frame 11Y is located in the body housing 2. In the state in which the developer cartridge 6Y is mounted on the image forming apparatus 1, the support frame 11Y supports the toner storage unit 61Y.

Figure 6:
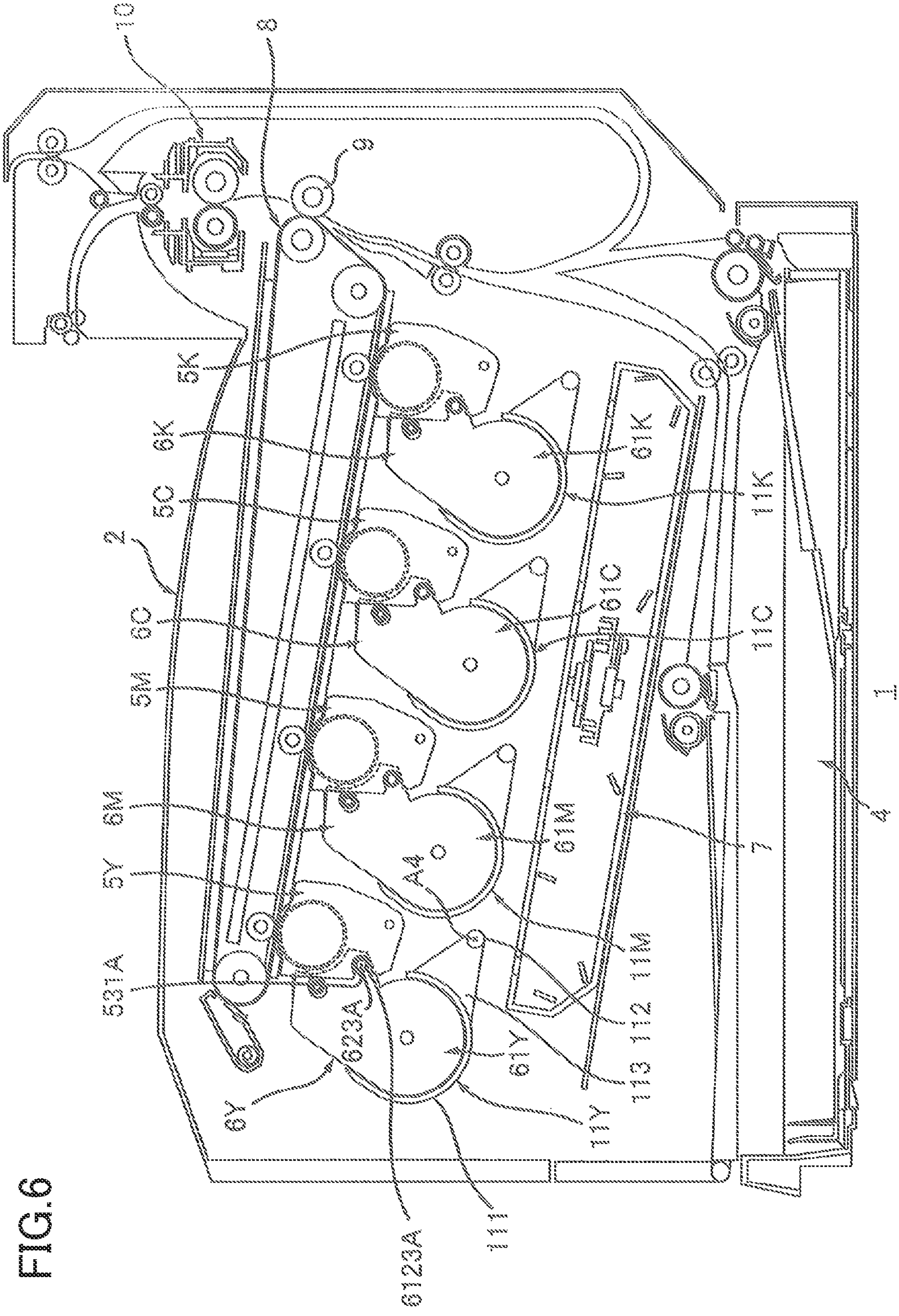
FIG. 6 is a view for explaining a movement of the developer cartridge in a state in which a support frame is positioned at a frame first position and the developer cartridge is positioned at a first position.
Figure 7:
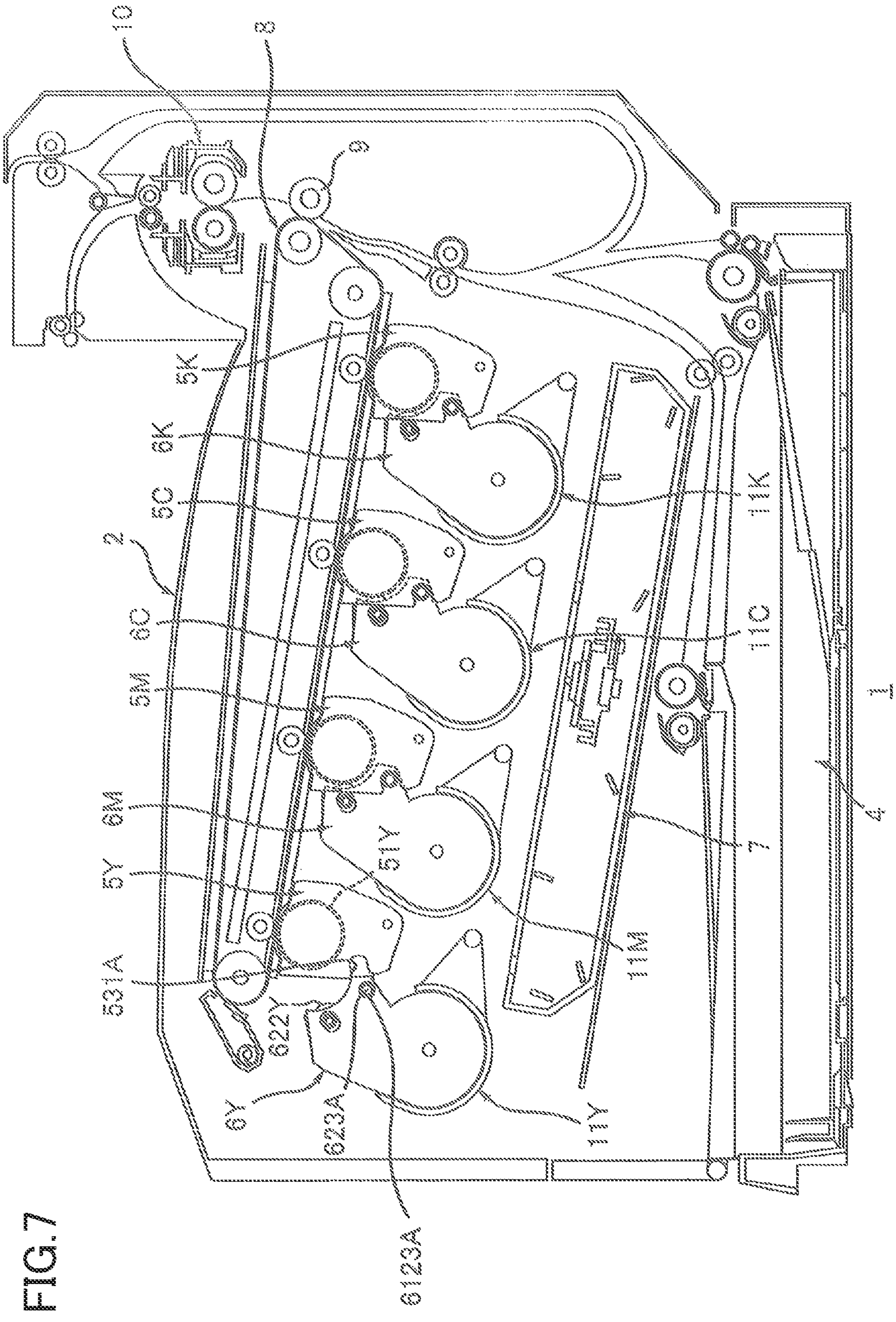
FIG. 7 is a view for explaining of a movement of the developer cartridge in a state in which the support frame is positioned at a frame second position and the developer cartridge is positioned at a second position.

As illustrated in FIG. 6 and FIG. 7, in a state in which the support frame 11Y supports the toner storage unit 61Y, the support frame 11Y is movable between a frame first position (see FIG. 6) and a frame second position (see FIG. 7). In the present embodiment, the support frame 11Y is pivotable around an axis A4 between the frame first position and the frame second position.

As illustrated in FIG. 6, in a state in which the support frame 11Y is positioned at the frame first position, the support frame 11Y positions the developer cartridge 6Y at a first position. In a state in which the developer cartridge 6Y is positioned at the first position, the developing roller 622Y (see FIG. 1) is in contact with the photoconductive drum 51Y (see FIG. 1).

As illustrated in FIG. 7, in a state in which the support frame 11Y is positioned at the frame second position, the support frame 11Y positions the developer cartridge 6Y at a second position. In a state in which the developer cartridge 6Y is positioned at the second position, the developing roller 622Y is spaced apart from the photoconductive drum 51Y.

That is, in the state in which the drum cartridge 5Y and the developer cartridge 6Y are mounted on the image forming apparatus 1, the developer cartridge 6Y is movable between the first position and the second position.

As illustrated in FIG. 6, the support frame 11Y includes a supporting portion 111, an axis portion 112 and an arm portion 113.

In the state in which the developer cartridge 6Y is mounted on the image forming apparatus 1, the supporting portion 111 supports the toner storage unit 61Y. The supporting portion 111 extends in the first direction. The supporting portion 111 has an arc shape curved along an outer surface of the toner storage unit 61Y.

The axis portion 112 is spaced apart from the supporting portion 111. The axis portion 112 extends in the first direction along the axis A4.

The arm portion 113 connects the supporting portion 111 with the axis portion 112.

Effects

According to the developer cartridge 6Y, as illustrated in FIG. 4 and FIG. 5, the toner storage unit 61Y includes the first storage chamber 611 capable of storing toner and the second storage chamber 612 storing the developer housing 621Y. And, the developer housing 621Y is supported by the toner storage unit 61Y so as to be movable. Accordingly, the developing roller 622Y is movable with respect to the toner storage unit 61Y.

And, as illustrated in FIG. 1, in a case where the developer cartridge 6Y is mounted on the image forming apparatus 1 and the toner storage unit 61Y of the developer cartridge 6Y is supported by the image forming apparatus 1, the developing roller 622Y movable with respect to the toner storage unit 61Y is in contact with the photoconductive drum 51Y. Accordingly, the developing roller 622Y becomes movable with respect to the photoconductive drum 51Y.

Moreover, since the toner storage unit 61Y can support the developer housing 621Y, it is possible to secure degree of parallelization of the developing roller 622Y with respect to the photoconductive drum 51Y.

Accordingly, it is possible to secure the degree of parallelization of the developing roller 622Y with respect to the photoconductive drum 51Y while the developing roller 622Y is movable with respect to the photoconductive drum 51Y.

As illustrated in FIG. 6, the image forming apparatus 1 includes the support frame 11Y. In the state in which the developer cartridge 6Y is mounted on the image forming apparatus 1, the support frame 11Y supports the toner storage unit 61Y of the developer cartridge 6Y.

Accordingly, it is possible to bring the developing roller 622Y into contact with the photoconductive drum 51Y in a state in which the developing roller 622Y is movable with respect to the toner storage unit 61Y. Moreover, since the developer housing 621Y is supported by the toner storage unit 61Y, it is possible to secure the degree of parallelization of the developing roller 622Y with respect to the photoconductive drum 51Y.

Accordingly, it is possible to secure the degree of parallelization of the developing roller 622Y with respect to the photoconductive drum 51Y while the developing roller 622Y is movable with respect to the photoconductive drum 51Y.

According to the image forming apparatus 1, as illustrated in FIG. 6, in a state in which the drum cartridge 5Y and the developer cartridge 6Y are mounted on the body housing 2, the shaft 623A of the developing unit 62Y engages with the first engaged portion 531A of the drum cartridge 5Y via the receiving portion 6123A. Moreover, in the state in which the drum cartridge 5Y and the developer cartridge 6Y are mounted on the body housing 2, the shaft 623B of the developing unit 62Y (see FIG. 5) engages with the second engaged portion 531B of the drum cartridge 5Y (see FIG. 3) via the receiving portion 6123B (see FIG. 5).

As a result of this, in the state in which the drum cartridge 5Y and the developer cartridge 6Y are mounted on the body housing 2, it is possible to support ends of the developer housing 621Y in the first direction by the drum cartridge 5Y.

Accordingly, it is possible to secure the degree of the parallelization of the developing roller 622Y with respect to the photoconductive drum 51Y more.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below.

Modifications

There will be described modifications of the developer cartridge 6Y with reference to FIG. 8 to FIG. 13. It is noted that the same reference numerals as used in the above-described embodiment are used to designate the corresponding elements of the modifications, and an explanation of which is dispensed with or simplified.

Figure 8:
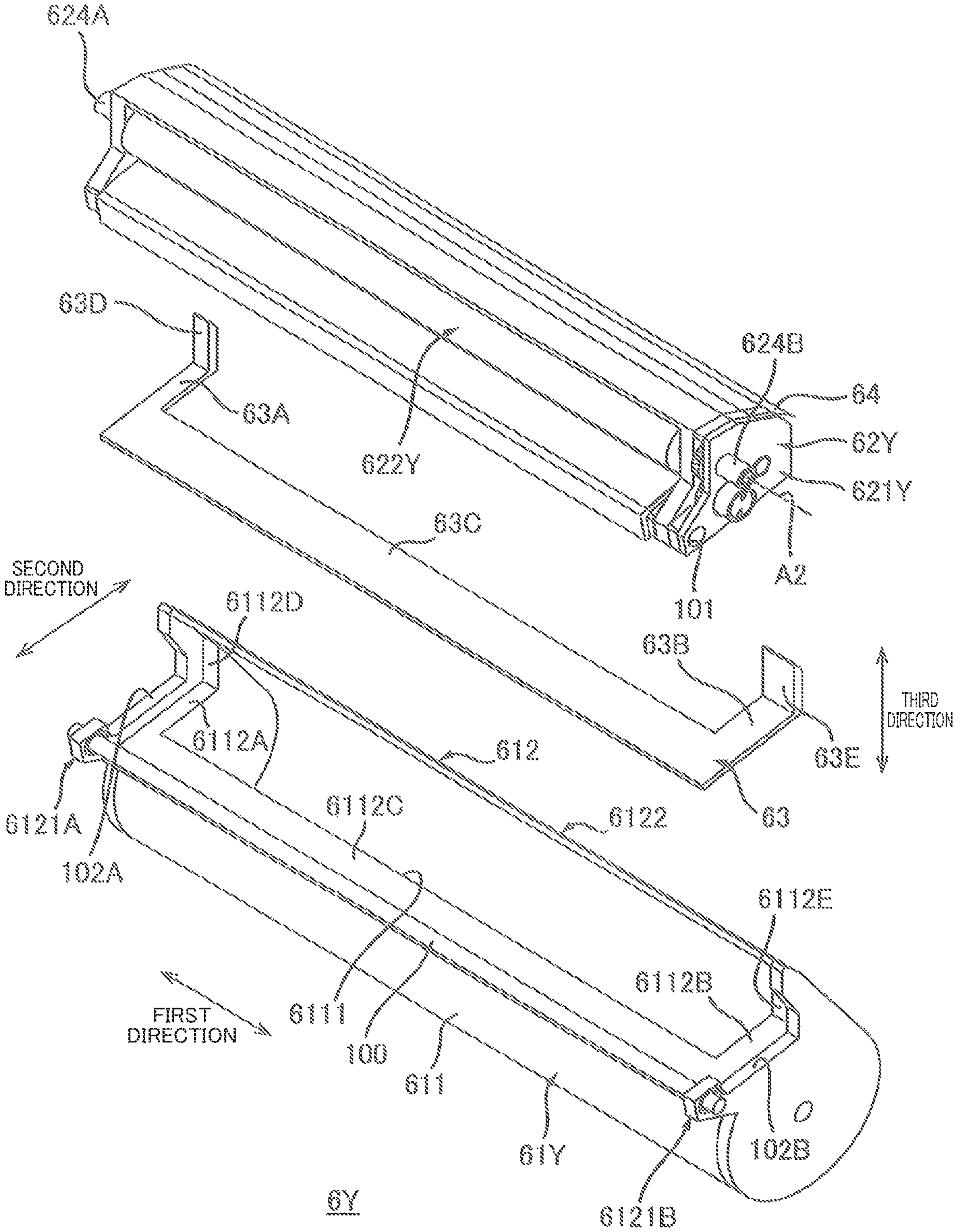
FIG. 8 is a disassembled perspective view of a developer cartridge.

As illustrated in FIG. 8, the toner storage unit 61Y may include a shaft 100. In this case, the toner storage unit 61Y does not include the receiving portions 6123A, 6123B.

The shaft 100 extends in the first direction. A first end of the shaft 100 in the first direction is supported by the support side wall 6121A of the second storage chamber 612. A second end of the shaft 100 in the first direction is supported by the support side wall 6121B of the second storage chamber 612.

The developer housing 621Y has a hole 101. It is noted that the developer housing 621Y does not include the shafts 623A, 623B.

Figure 9:
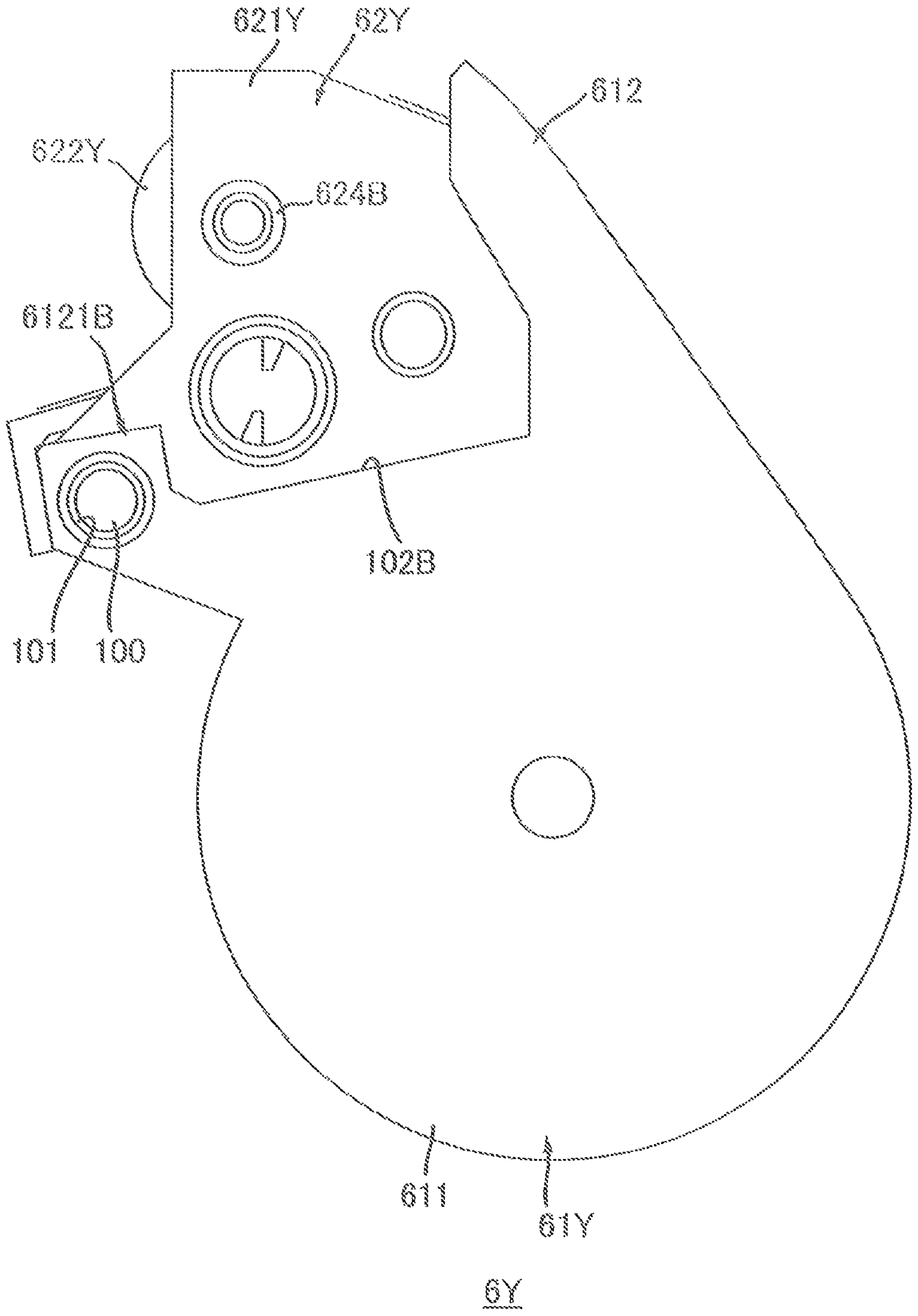
FIG. 9 is a side view of the developer cartridge illustrated in FIG. 8.

As illustrated in FIG. 9, the shaft 100 is fitted into the hole 101. As a result of this, the shaft 100 supports the developer housing 621Y.

Moreover, the support side wall 6121A may have a cutout 102A, and the support side wall 6121B may have a cutout 102B. The protrusion 624A of the developing unit 62Y is located in the cutout 102A. The protrusion 624B of the developing unit 62Y is located in the cutout 102B.

In the present modification, it is possible to achieve the same effects as achieved in the above-described embodiment.

The movement of the developer housing 621Y with respect to the toner storage unit 61Y is not limited to the rotation of the developer housing 621Y with respect to the toner storage unit 61Y. The developer housing 621Y may be movable in a straight line with respect to the toner storage unit 61Y.

Figure 10:
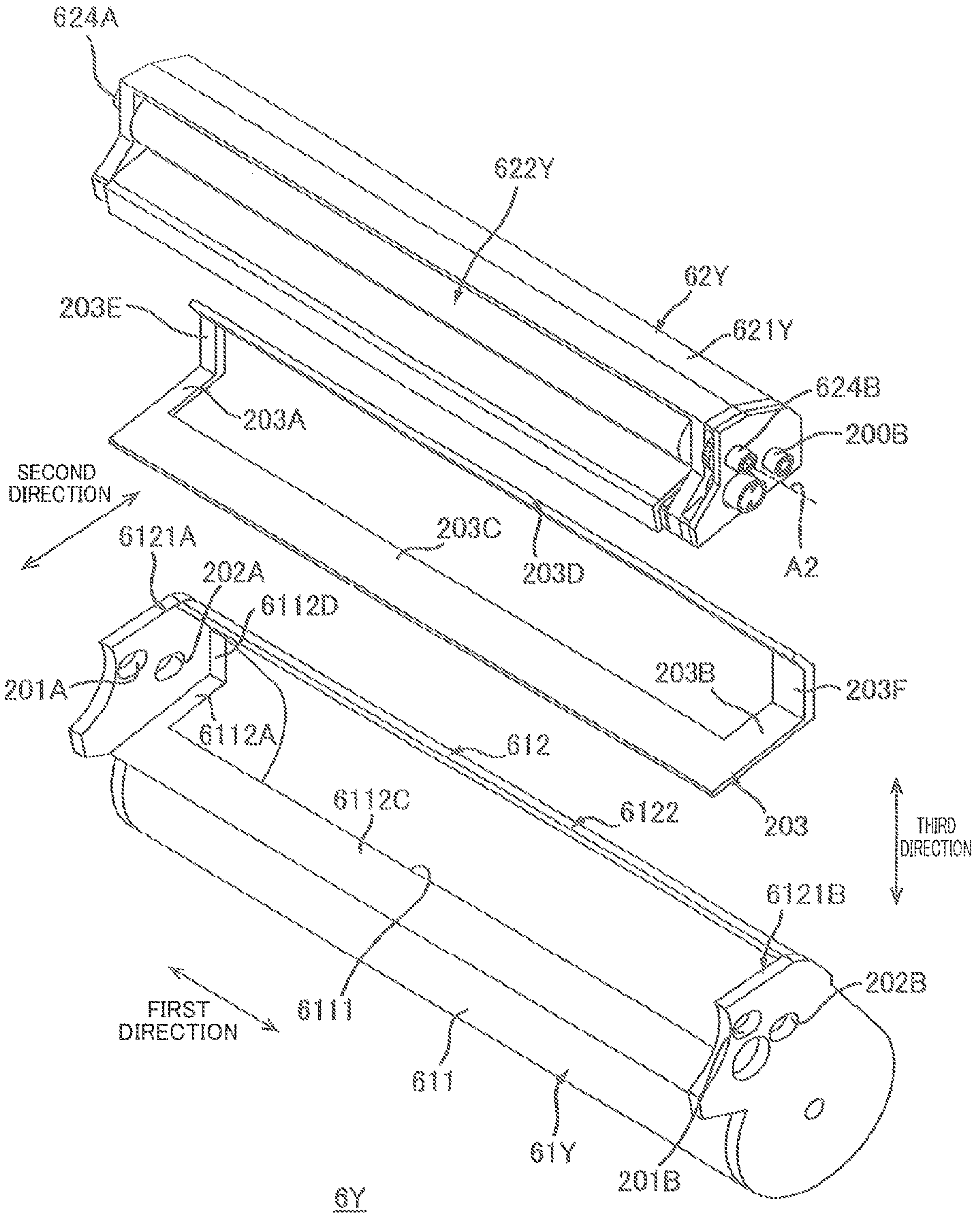
FIG. 10 is a disassembled perspective view of a developer cartridge.

In this case, as illustrated in FIG. 10, the support side wall 6121A has a hole 201A and a hole 202A.

The hole 201A is spaced apart from the cover side wall 6122 in the second direction. The hole 201A extends in a direction intersecting the first direction. More specifically, in a state in which the drum cartridge 5Y and the developer cartridge 6Y are mounted on the image forming apparatus 1 and the developing roller 622Y is in contact with the photoconductive drum 51Y, the hole 201A extends in a direction directed from the drum axis A1 (see FIG. 1) toward the developer axis A2 (see FIG. 1). The protrusion 624A of the developing unit 62Y is fitted into the hole 201A.

The hole 202A is spaced apart from the hole 201A. The hole 202A is located between the hole 201A and the cover side wall 6122 in the second direction. The hole 202A extends in a direction in which the hole 201A extends. A protrusion 200A of the developing unit 62Y is fitted into the hole 202A. It is noted that the protrusion 200A is not illustrated. The protrusion 200A will be described below.

The support side wall 6121B has a hole 201B and a hole 202B.

The hole 201B is spaced apart from the cover side wall 6122 in the second direction. The hole 201B extends in a direction in which the hole 201A extends. The protrusion 624B of the developing unit 62Y is fitted into the hole 201B.

The hole 202B is spaced apart from the hole 201B. The hole 202B is located between the hole 201B and the cover side wall 6122 in the second direction. The hole 202B extends in a direction in which the hole 201A extends. A protrusion 200B of the developing unit 62Y is fitted into the hole 202B. The protrusion 200B will be described below.

The developing unit 62Y includes the two protrusions 200A, 200B. The developing unit 62Y does not include the shafts 623A, 623B.

The protrusion 200A is spaced apart from the protrusion 624A in the second direction. The protrusion 200A protrudes outwardly, in the first direction, from the first side surface of the developer housing 621Y in the first direction. It is noted that the protrusion 200A may be attached to the first side surface of the developer housing 621Y in the first direction. The protrusion 200A is fitted to the hole 202A of the toner storage unit 61Y.

The protrusion 200B is spaced apart from the protrusion 624B in the second direction. The protrusion 200B protrudes outwardly, in the first direction, from the second side surface of the developer housing 621Y in the first direction. It is noted that the protrusion 200B may be attached to the second side surface of the developer housing 621Y in the first direction. The protrusion 200B is fitted into the hole 202B of the toner storage unit 61Y.

Figure 11:
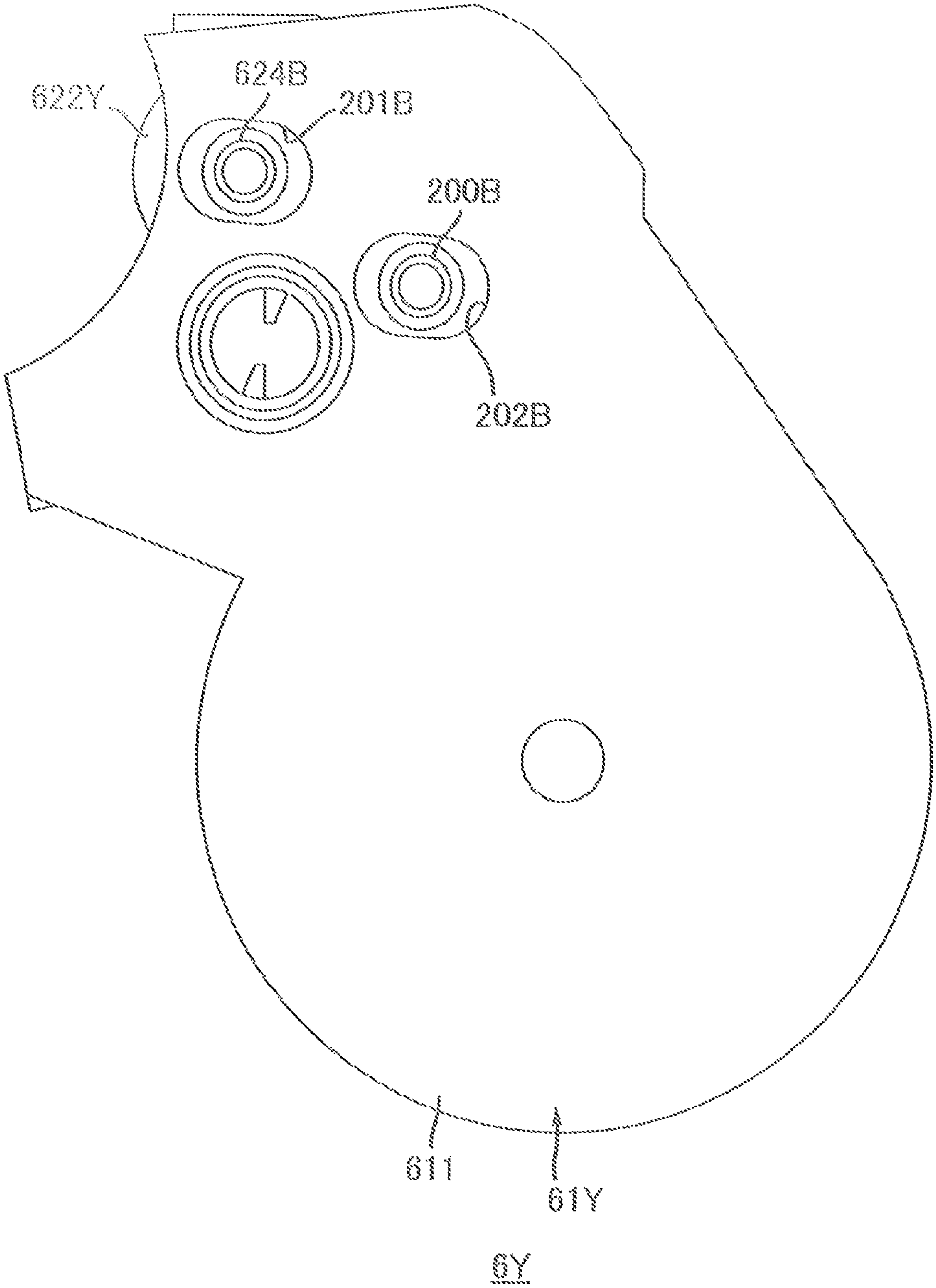
FIG. 11 is a side view of the developer cartridge illustrated in FIG. 10.

As illustrated in FIG. 11, when the protrusion 624A is fitted into the hole 201A, the protrusion 624B is fitted into the hole 201B, the protrusion 200A is fitted into the hole 202A and the protrusion 200B is fitted into the hole 202B, the developer housing 621Y is supported by the toner storage unit 61Y so as to be movable. The developer housing 621Y is movable with respect to the toner storage unit 61Y in a direction in which each of the holes 201A, 201B, 202A, 202B extends.

Moreover, as illustrated in FIG. 10, the developer cartridge 6Y may not include the second seal member 64 (see FIG. 5). The developer cartridge 6Y may include a seal member 203.

The seal member 203 seals an area between the toner storage unit 61Y and the developer housing 621Y. The seal member 203 is elastically deformable in accordance with the movement of the developer housing 621Y. The seal member 203 is, for example, a sponge. The seal member 203 includes a first seal portion 203A, a second seal portion 203B, a third seal portion 203C, a fourth seal portion 203D, a fifth seal portion 203E and a sixth seal portion 203F.

The first seal portion 203A is located at a first end of the seal member 203 in the first direction. The first seal portion 203A has a width in the first direction and extends in the second direction. The first seal portion 203A is located between the first end of the developer housing 621Y in the first direction and the first support surface 6112A of the toner storage unit 61Y. The first seal portion 203A is in contact with the first end of the developer housing 621Y in the first direction and the first support surface 6112A of the toner storage unit 61Y. The first seal portion 203A seals an area between the first end of the developer housing 621Y in the first direction and the first support surface 6112A.

The second seal portion 63B is located at a second end of the seal member 203 in the first direction. The second seal portion 203B is spaced apart from the first seal portion 203A in the first direction. The second seal portion 203B has a width in the first direction and extends in the second direction. The second seal portion 203B is located between the second end of the developer housing 621Y in the first direction and the second support surface 6112B of the toner storage unit 61Y (see FIG. 4). The second seal portion 203B is in contact with the second end of the developer housing 621Y in the first direction and the second support surface 6112B of the toner storage unit 61Y. The second seal portion 203B seals an area between the second end of the developer housing 621Y in the first direction and the second support surface 6112B.

The third seal portion 203C is located between the first seal portion 203A and the second seal portion 203B in the first direction. The third seal portion 203C has a width in the second direction and extends in the first direction. A first end of the third seal portion 203C in the first direction continues to the first seal portion 203A. A second end of the third seal portion 203C in the first direction continues to the second seal portion 203B. The third seal portion 203C is located between the first end of the developer housing 621Y in the second direction and the third support surface 6112C of the toner storage unit 61Y. The third seal portion 203C is in contact with the first end of the developer housing 621Y in the second direction and the third support surface 6112C of the toner storage unit 61Y. The third seal portion 203C seals an area between the first end of the developer housing 621Y the second direction and the third support surface 6112C.

The fourth seal portion 203D is located between the second end of the developer housing 621Y in the second direction and the cover side wall 6122 of the toner storage unit 61Y. The fourth seal portion 203D extends in the first direction. The fourth seal portion 203D is in contact with the second end of the developer housing 621Y in the second direction and the cover side wall 6122 of the toner storage unit 61Y. The fourth seal portion 203D seals an area between the second end of the developer housing 621Y in the second direction and the cover side wall 6122.

The fifth seal portion 203E is located at the first end of the seal member 203 in the first direction. The fifth seal portion 203E is located at a second end of the first seal portion 203A in the second direction. The fifth seal portion 203E has a width in the first direction. The fifth seal portion 203E extends in the third direction. A first end of the fifth seal portion 203E in the third direction continues to the first seal portion 203A. A second end of the fifth seal portion 203E in the third direction continues to the fourth seal portion 203D. The fifth seal portion 203E is located between the first end of the developer housing 621Y in the first direction and the fourth support surface 6112D of the toner storage unit 61Y. The fifth seal portion 203E is in contact with the first end of the developer housing 621Y in the first direction and the fourth support surface 6112D of the toner storage unit 61Y. The fifth seal portion 203E seals an area between the first end of the developer housing 621Y in the first direction and the fourth support surface 6112D.

The sixth seal portion 203F is located at the second end of the seal member 203 in the first direction. The sixth seal portion 203F is located at the second end of the second seal portion 203B in the second direction. The sixth seal portion 203F has a width in the first direction. The sixth seal portion 203F extends in the third direction. A first end of the sixth seal portion 203F in the third direction continues to the second seal portion 203B. A second end of the sixth seal portion 203F in the third direction continues to the fourth seal portion 203D. The sixth seal portion 203F is located between the second end of the developer housing 621Y in the first direction and the fifth support surface 6112E of the toner storage unit 61Y (see FIG. 4). The sixth seal portion 203F is in contact with the second end of the developer housing 621Y in the first direction and the fifth support surface 6112E of the toner storage unit 61Y. The sixth seal portion 203F seals an area between the second end of the developer housing 621Y in the first direction and the fifth support surface 6112E.

In the present modification, it is possible to achieve the same effects as achieved in the above-described embodiment. In a case where the developing unit 62Y is movable with respect to the toner storage unit 61Y, the configuration supporting the developing unit 62Y by the toner storage unit 61Y is not limited to the above described configuration.

Figure 12:
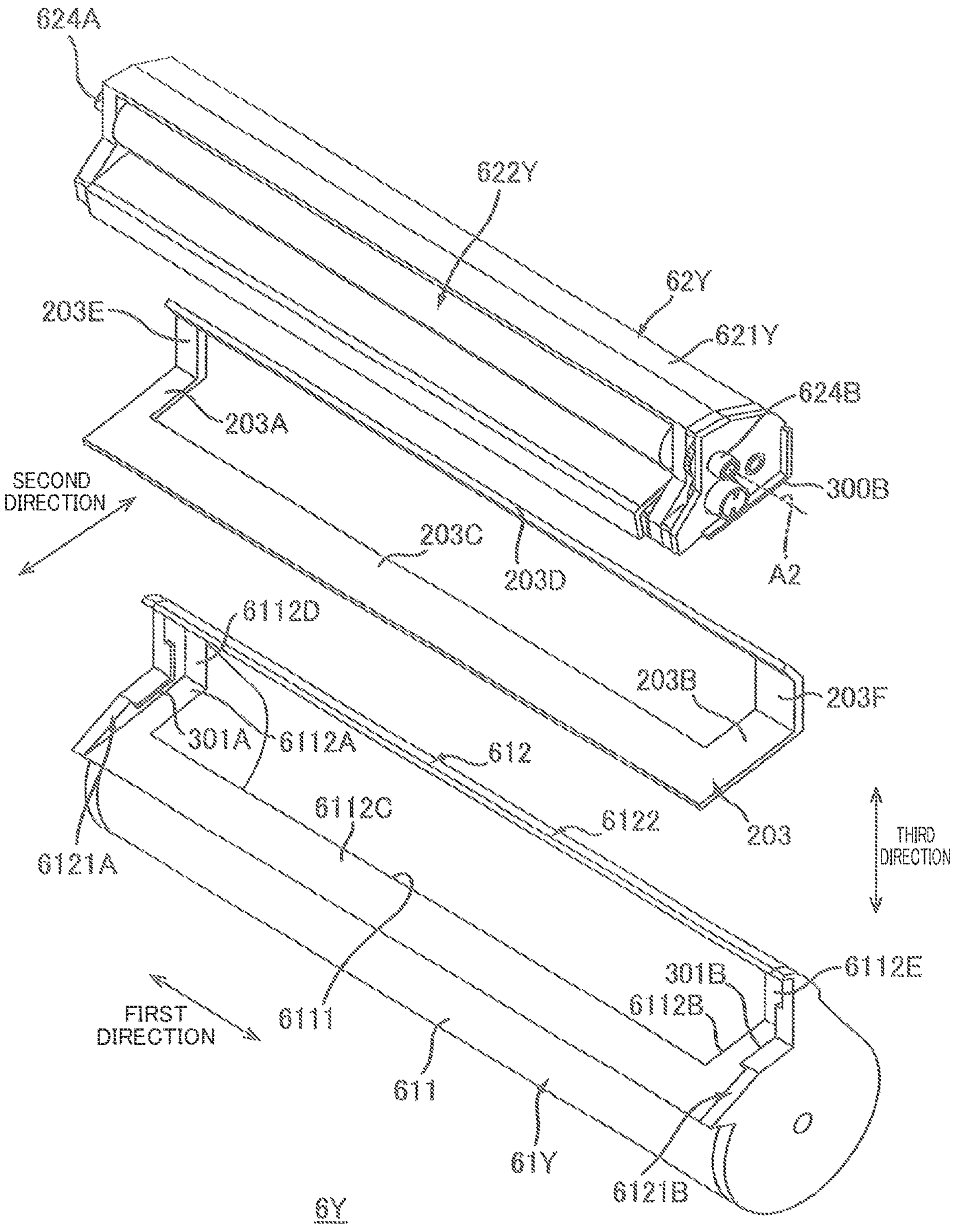
FIG. 12 is a disassembled perspective view of a developer cartridge.

For example, as illustrated in FIG. 12, the developing unit 62Y may include developer ribs 300A, 300B. In other words, the developer cartridge 6Y may include the developer ribs 300A, 300B. It is noted that the developer rib 300A is not illustrated.

The developer rib 300A protrudes outwardly, in the first direction, from the first side surface of the developer housing 621Y in the first direction. The developer rib 300A has the same shape as the developer rib 300B.

The developer rib 300B protrudes outwardly, in the first direction, from the second side surface of the developer housing 621Y in the first direction. The developer rib 300B has a L-shape.

The toner storage unit 61Y includes toner ribs 301A, 301B.

The toner rib 301A protrudes inwardly, in the first direction, from an inner surface of the support side wall 6121A in the first direction. The toner rib 301A protrudes toward the developer rib 300A from the inner surface of the support side wall 6121A in the first direction. In other words, the toner rib 301A protrudes toward the developer rib 300A from an inner surface of the second storage chamber 612 in the first direction. The toner rib 301A has a L-shape. The toner rib 301A engages with the developer rib 300A.

Figure 13:
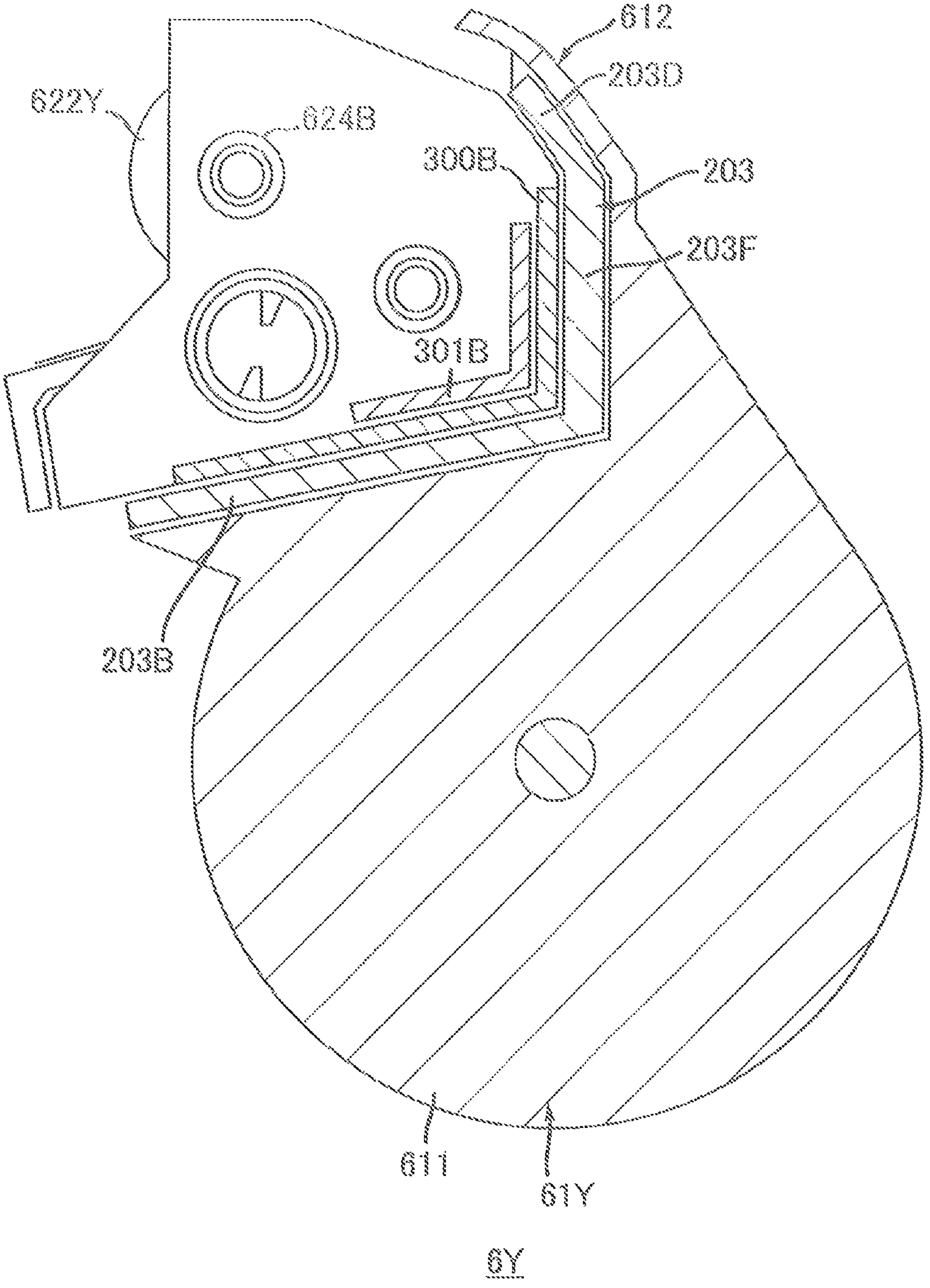
FIG. 13 is a cross-sectional view of the developer cartridge illustrated in FIG. 12 illustrating a cross section passing a developer rib and a toner rib.

The toner rib 301B protrudes inwardly, in the first direction, from an inner surface of the support side wall 6121B in the first direction. The toner rib 301B protrudes toward the developer rib 300B from the inner surface of the support side wall 6121B in the first direction. In other words, the toner rib 301B protrudes toward the developer rib 300B from the inner surface of the second storage chamber 612 in the first direction. The toner rib 301B has a L-shape. As illustrated in FIG. 13, the toner rib 301B engages with the developer rib 300B. More specifically, the developer rib 300B is located between the toner rib 301B and the seal member 203.

In the present modification, it is possible to achieve the same effects as achieved in the above-described embodiment.

What is claimed is:

1. A developer cartridge, comprising:

a developing roller rotatable around a developer axis extending in a first direction;

a developer housing supporting the developing roller; and a toner storage unit including:

a first storage chamber capable of storing toner; and a second storage chamber storing the developer housing, wherein the toner storage unit supports the developer housing such that the developer housing is movable with respect to the first storage chamber in a direction intersecting the first direction.

2. The developer cartridge according to claim 1, wherein the developer cartridge further comprises a shaft protruding in the first direction from an outer surface of the developer housing in the first direction, and wherein the toner storage unit further includes a tubular receiver configured to receive the shaft in the second storage chamber.

3. The developer cartridge according to claim 2, wherein the developer housing is rotatable around the shaft with respect to the toner storage unit.

4. The developer cartridge according to claim 1, wherein the toner storage unit further includes a shaft extending in the first direction so as to support the developer housing.

5. The developer cartridge according to claim 1, wherein the developer cartridge further includes a protrusion protruding in the first direction from an outer surface of the developer housing in the first direction, wherein the second storage chamber of the toner storage unit has a hole into which the protrusion is fitted, the hole extending in the direction intersecting the first direction, and wherein the developer housing is movable with respect to the toner storage unit in a direction in which the hole extends.

6. The developer cartridge according to claim 1, wherein the developer cartridge further comprises a developer rib protruding in the first direction from an outer surface of the developer housing in the first direction, and wherein the toner storage unit further includes a toner rib that engages with the developer rib and protruding toward the developer rib from an inner surface of the second storage chamber in the first direction.

7. The developer cartridge according to claim 1, wherein the developer housing includes a protruding portion protruding outwardly than an outer surface of the developer housing in the first direction, and wherein the toner storage unit has a hole into which the protruding portion is inserted.

8. The developer cartridge according to claim 1, wherein the toner storage unit includes:

an opening through which the first storage chamber and the second storage chamber communicate with each other;

a first support surface located on a first side with respect to the opening in the first direction and supporting a first end of the developer housing in the first direction;

a second support surface located on a second side with respect to the opening in the first direction and supporting a second end of the developer housing in the first direction;

a third support surface located on a first side with respect to the opening in a second direction and supporting a first end of the developer housing in the second direction; and a cover side wall located on a second side with respect to the opening in the second direction and covering a second end of the developer housing in the second direction.

9. The developer cartridge according to claim 8, further comprising a first seal member, wherein the first seal member includes:

a first seal portion sealing an area between the first end of the developer housing in the first direction and the first support surface;

a second seal portion sealing an area between the second end of the developer housing in the first direction and the second support surface; and a third seal portion sealing an area between the first end of the developer housing in the second direction and the third support surface.

10. The developer cartridge according to claim 9, further comprising a second seal member configured to seal an area between the second end of the developer housing in the second direction and the cover side wall.

11. The developer cartridge according to claim 10, wherein the first seal member is a sponge, and wherein the second seal is a film.

12. The developer cartridge according to claim 1, wherein the toner storage unit includes:

an opening through which the first storage chamber and a second storage chamber communicate with each other;

a first support surface located on a first side with respect to the opening in the first direction and supporting a first end of the developer housing in the first direction;

a second support surface located on a second side with respect to the opening in the first direction and supporting a second end of the developer housing in the first direction;

a third support surface located on a first side with respect to the opening in the first direction and supporting a first end of the developer in the second direction; and a cover side wall located on a second side with respect to the opening in the second direction and covering a second end of the developer housing in the second direction.

13. The developer cartridge according to claim 12, further comprising a seal member, and wherein the seal member includes:

a first seal portion sealing an area between the first end of the developer housing in the first direction and the first support surface;

a second seal portion sealing an area between the second end of the developer housing in the first direction and the second support surface;

a third seal portion sealing an area between the first end of the developer housing in the second direction and the third support surface; and a fourth seal portion sealing an area between the second end of the developer housing in the second direction and the cover side wall.

14. The developer cartridge according to claim 1, wherein the developer cartridge further comprises an agitator configured to agitate the toner in the first storage chamber of the toner storage unit and rotatable around an agitator axis extending in the first direction, and wherein the agitator axis is located at a position lower than the developer housing in a state in which the developer cartridge is mounted on an image forming apparatus.

15. The developer cartridge according to claim 1, wherein an upper surface of the toner in the toner storage unit indicating an amount of the toner in the toner storage unit is located below the developer housing in a state in which the developer cartridge is mounted on an image forming apparatus.

16. The developed cartridge according to claim 1, wherein the toner storage supports the developer housing such that the developer housing is moveable together with the developing roller with respect to the first storage chamber in the direction intersecting the first direction.

17. An image forming apparatus, comprising:

a body housing;

a transfer unit;

a drum cartridge including a photoconductive drum and located below the transfer unit in a state in which the drum cartridge is mounted on the body housing;

a developer cartridge including:

a developing roller rotatable around a developer axis extending in a first direction;

a developer housing supporting the developing roller; and a toner storage unit including a first storage chamber capable of storing toner and a second storage chamber storing the developer housing, the toner storage unit supporting the developer housing such that the developer housing is movable with respect to the first storage chamber in a direction intersecting the first direction;

a support frame supporting the toner storage unit in a state in which the developer cartridge is mounted on the body housing.

18. The image forming apparatus according to claim 17, wherein the developer cartridge includes:

a first engaging portion located at a first end of the developer housing in the first direction;

a second engaging portion located at a second end of the developer housing in the first direction, wherein the drum cartridge includes:

a first engaged portion located at a first end of the drum cartridge in the first direction and with which the first engaging portion engages in a state in which the drum cartridge and the developer cartridge are mounted on the body housing; and a second engaged portion located at a second end of the drum cartridge in the first direction and with which the second engaging portion engages in the state in which the drum cartridge and the developer cartridge are mounted on the body housing.

19. The image forming apparatus according to claim 17, wherein the developer cartridge is movable between a first position at which the developing roller is in contact with the photoconductive drum and a second position at which the developing roller is spaced apart from the photoconductive drum in the state in which the drum cartridge and the developer cartridge are mounted on the body housing.

* * * * *